United States Patent Office.

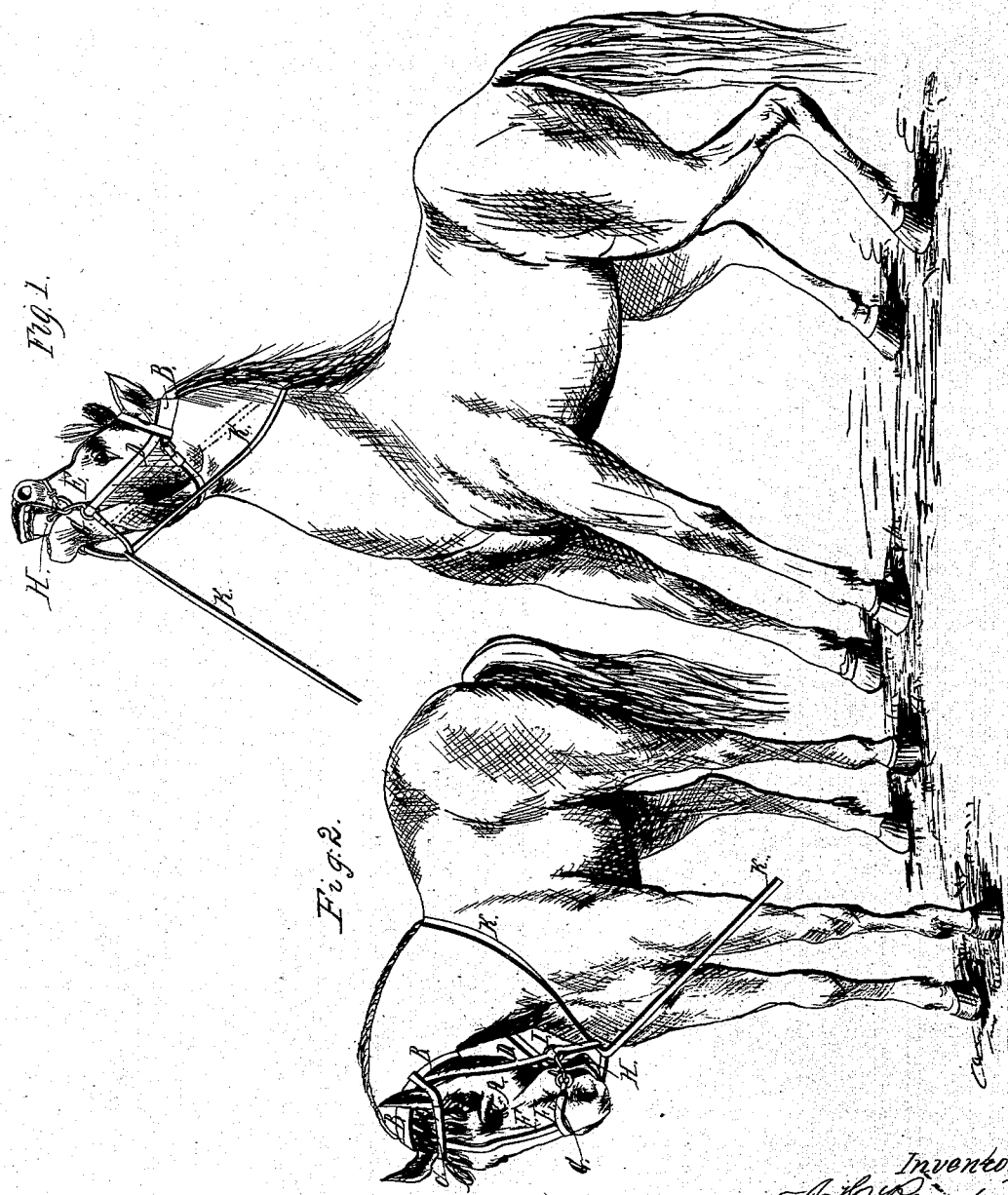

IMPROVEMENT IN BRIDLES.

A. H. ROCKWELL, OF HARPERSVILLE, NEW YORK.

Letters Patent No. 60,254, dated December 4, 1866.

SPECIFICATION.

TO ALL WHOM IT MAY CONCERN:

Be it known that I, A. H. ROCKWELL, of Harpersville, in the county of Broome, and State of New York, have invented a new and useful Improvement in "Bridles;" and I do hereby declare that the following is a full, clear, and exact description thereof, which will enable others skilled in the art to make and use the same, reference being had to the accompanying drawing, forming part of this specification.

The object which the present invention is designed to secure or attain, is to provide a means by which a horse that is in any way vicious, or inclined to be unruly, or to kick, while being curried, or when in harness, or when being led out of his stall, or at any other time, can be brought to a complete state of control or subjugation as it were, and in such a manner as not to produce the least injury to the mouth of the horse. This result is satisfactorily attained by the present invention, as will be apparent from the following detail description of the same, reference being had to the accompanying plate of drawings, in which—

Figures 1 and 2 are both side elevations or views of a horse, having my improvement in bridles or head-stalls applied, with the head of the horse in the one figure thrown up, and in the other drawn down.

A, in the drawings, represents the head-stall or bridle, which, in the present instance, consists of the throat-strap B, brow-band C, cheek-straps D, and nose-band E, with the latter connected to the brow-band C, through a strap, F, passing up over the nose of the horse. The nose-band, E, is hung to the inner and loose rings G, of the double-ring-bit H, to the outer rings I, of which bit, the lower ends of the cheek-straps, D, are hung, as is plainly shown in the drawings. To one of the outer rings I, of the double-ring-bit H, a strap, K, is hung or buckled, from which its loose end is passed through the other outer ring of the bit, and thence around the neck of the horse, back to the same side of the horse's mouth at which the said strap K was fastened to the bit-ring, where it is then passed between that portion of it which extends under the horse's mouth or jaw, from one outside ring of the bit to the other, and the said mouth, and drawn down over the front edge, a, of such portion of the said strap, as plainly illustrated in the drawings. With the strap K hung to the double-ring-bit H, and passed around the neck of a horse, in the manner above explained, it is plain to be seen, that if the loose end of such strap be pulled, it will cause the inner and loose rings of the bit to press against the sides of the horse's mouth or jaws to a greater or less extent, according to the amount of force exerted upon the said strap. By this means, it is obvious, a control of the horse can be obtained, for if he should show the least sign to kick, or in any other way to be vicious, by simply pulling upon the strap K, the inner bit-rings will thus be caused to so bear against the sides of the horse's mouth or jaw, as to bring him instantly to a state of subjection, and to such a position, if the said line or strap is suddenly or quickly pulled or "jerked," as to render it impossible for him to throw up, or, in other words, kick out, with the hind legs, which position is plainly shown in fig. 1 of the drawings; the horse's head being brought to the position shown in fig. 2 by an even and steady pull upon the strap.

Among the many advantages secured by the present invention, may be here mentioned, as the most important, that it is simple, cheap, and easy to be applied to a horse; that it not only enables a horse to be brought to a perfect state of control or subjugation, as it were, while it is worn by him, but at the same time with its use upon a horse, such horse can be finally brought to understand and to obey the bit of the harness, when driven in harness; that by it, when the horse is being curried, or being led out of his stall, or at any other time, he is at all times within the control of the person who has hold of the strap K, for the reason that a simple pull by such person upon the said strap, will instantly bring the inner rings of the double-ring-bit to bear upon the sides of the horse's mouth or jaws, thus making him succumb and yield, as is obvious, and without any serious, and, in fact, no injury to his mouth or jaws. By means of the nose-strap the nose-band is held in position upon the horse's head, and prevented from slipping up, or out of place.

Having thus described my invention, I claim as new, and desire to secure by Letters Patent—

The combination of the double-ring-bit H, head-stall A, and strap K, when all connected together and applied to a horse, or other animal, substantially as and for the purpose described.

The above specification of my invention signed by me this 22d day of August, 1866.

A. H. ROCKWELL.

Witnesses:
 JAS. A. SERVICE,
 ALBERT W. BROWN.